July 17, 1934. H. LIEBER ET AL Re. 19,246

MICROPHONIC AMPLIFIER HEARING AID DEVICE

Original Filed July 25, 1932 2 Sheets-Sheet 1

INVENTORS
HUGO LIEBER
E. C. NICHOLIDES
BY S. M. Pineles
ATTORNEY

MICROPHONIC AMPLIFIER HEARING AID DEVICE

Original Filed July 25, 1932 2 Sheets-Sheet 2

INVENTORS
HUGO LIEBER
E. C. NICHOLIDES
BY S. M. Pineles
ATTORNEY

Reissued July 17, 1934

Re. 19,246

UNITED STATES PATENT OFFICE 19,246

MICROPHONIC AMPLIFIER HEARING-AID DEVICE

Hugo Lieber and Emmanuel Christ Nicholides, New York, N. Y., assignors, by mesne assignments, to Lieber Patents Corporation, New York, N. Y., a corporation of New York Original No. 1,939,627, dated December 12, 1933, Serial No. 624,424, July 25, 1932. Application for reissue February 9, 1934, Serial No. 710,514

12 Claims. (Cl. 179—171)

This invention relates to microphonic amplifier hearing-aid devices, and it has among its objects portable aid devices provided with an improved microphone amplifier, that is efficient, powerful and accurate in amplifying and reproducing speech and sound, as well as simple in construction, and small and inconspicuous in appearance.

The features and objects of the invention will be best understood from the following description and explanation of an exemplification thereof, reference being had to the accompanying drawings, wherein Fig. 1 is a diagrammatic view of a hearing-aid device embodying the invention;

Portable hearing-aid devices for hard-of-hearing persons now in general use are composed of a microphone transmitter, a receiver, and a battery connected in series, the sound impulses impressed on the transmitter generating electrical oscillations which then reproduce the sound in the receiver and impress it on the hearing organs. A resistor and a cutout are usually included in the circuit of the receiver to permit regulation of the sound intensity and disconnection of the battery when the device is not in use.

Users of such hearing-aid devices almost invariably demand that the device shall be inconspicuous in wear. The receiver and the associated elements must therefore be extremely small. Since the device is almost continuously used, its elements are subjected to heavy mechanical and electrical strains. These are difficult to meet on account of the size limits. Furthermore, since most of the users are laymen with little mechanical or electrical knowledge, it is important that the instrument shall be simple, easy to manipulate, and require a minimum of attention.

The foregoing requirements impose serious limitations on the intensity and the clearness of the sound reproduction, and for this reason attempts have been made to provide such hearing-aid devices with amplifiers. Tube amplifier hearing-aids found almost no use, because their excessive size made them impractical. Microphone amplifiers came into a somewhat wider use, but they are still very limited, because of the deterioration of the microphone amplification after short use, and also because their operating limitations were found to render it difficult to provide practical small microphone amplifier hearing-aids in which the improvement due to the amplification is sufficient to outweight the complications.

The present invention provides a microphone-amplifier hearing-aid that will stand long use without deterioration, is rigid and efficient, requires little attention, and is small and inconspicuous.

Figure 2:
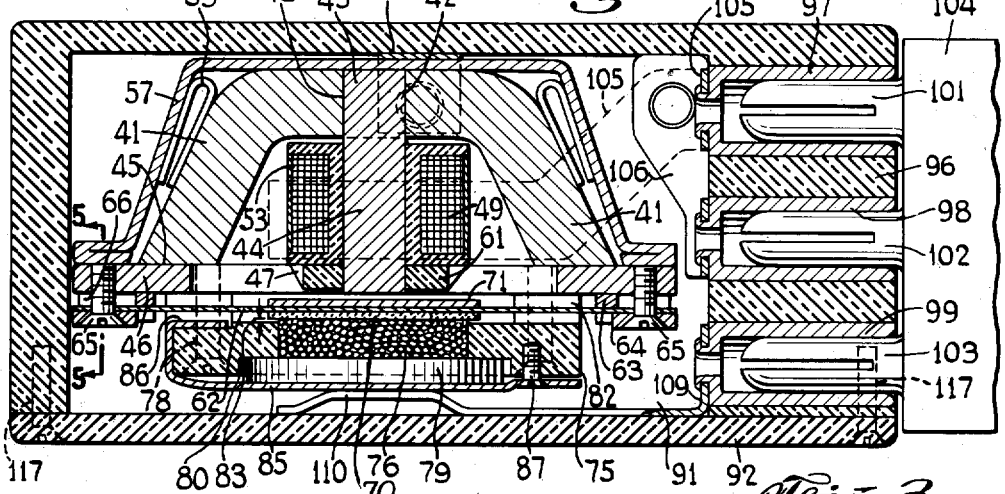
Fig. 2 is a horizontal sectional view of the microphone amplifier of the device along line 2—2 of Fig. 3.
Figure 3:
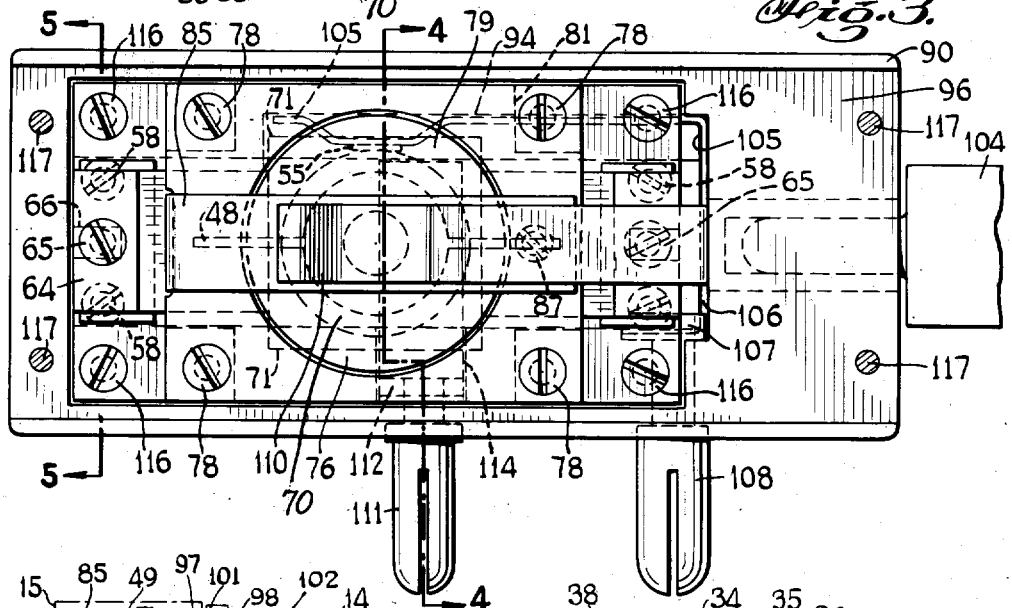
Fig. 3 is a front elevational view of the microphone amplifier, with the cover removed from the casing, along line 3—3 of Fig. 2.
Figure 1:
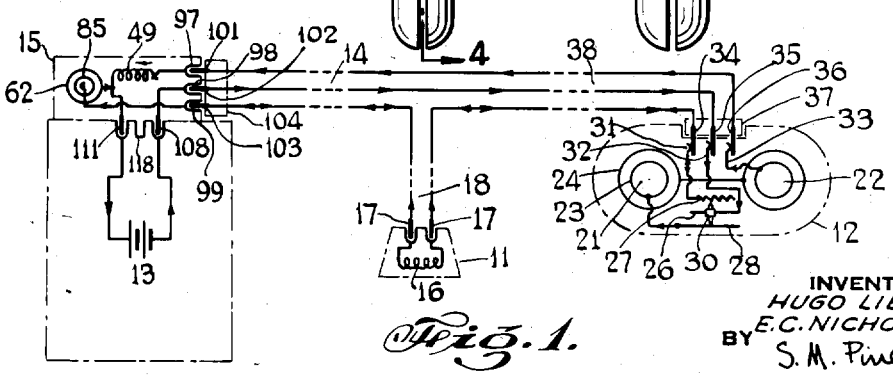

The general arrangement of the hearing-aid exemplifying the invention is shown diagrammatically in Fig. 1. It comprises a telephone receiver 11, a transmitter 12, a battery 13, a connecting cord 14 and a microphone amplifier 15. The receiver telephone 11 has an actuating coil 16 and is preferably made very small, midget size. The receiver has two socket terminals leading from the actuating coil 16, the socket terminals being detachably engaged by contact plugs 17 of a double strand branch 18 of the connecting cord 14. Instead of a telephone receiver, a bone-conduction receiver may be used which translates electric oscillations supplied from a microphone into mechanical vibrations and imparts them to the head bone structure to induce hearing in the auditory nerves.

The transmitter 12 is shown comprising two microphones 21, 22, each of which may comprise a carbon block 23, a carbon diaphragm 24, and a plurality of carbon balls or granules disposed therebetween to vary the resistance between the carbon block and the diaphragm in accordance with the sound impulses impinging upon the diaphragm.

The transmitter has mounted thereon a control unit 26 comprising a resistor 27, a stationary contact member 28, a sliding contact rod 29, and a movable contact member 30 slidable thereon by an externally projecting knob to be moved from the position where it is out of contact with the resistor 27 and the contact member 28 to positions where it engages and makes contact between rod 29 and the contact member 28 and the resistor 27, cutting out the resistor as it moves forward.

The transmitter is further provided with three plug contacts 31, 32, 33 connected, respectively, to the resistor 27, the movable contact member 30, and to the carbon block of microphone 22, the diaphragm of this microphone being connected through a conductor with the diaphragm of the other microphone 21, the carbon block of which is in turn connected to the stationary contact member 28 of the control unit.

The three plug contacts 31, 32, 33 of the transmitter are engaged by three plug pins 34, 35, 36, respectively, of transmitter plug 37 disposed at the end of a three stranded branch 38 of the connecting cord 14.

The microphone amplifier as actually constructed and used is shown enlarged in Figs. 2 to 6, the following description and data of its construction and materials being given as a guide in practicing the invention, without intention to limit the invention thereto.

The amplifier 15 comprises a pair of angularly-bent permanent magnets 41 of high quality steel horizontally assembled with like poles 42 of their inner arms on opposite sides of the rectangular rear piece 43 of a central round core member 44 of soft iron having high permeability.

The end surfaces 45 of the outer arms of the magnets 41 abut against the rear side of a vertically disposed, somewhat wider, flat, rectangular pole plate 46 of soft, highly permeable, iron extending between the arms, making a good magnetic joint therewith. The pole plate 46 has a conically-shaped, central perforation 47 surrounding the end of the central core, but spaced therefrom by an annular gap which is smallest at the coinciding front levels of the pole plate and the core end to reduce leakage. Slots 48 are provided in the pole plate 46 to reduce the eddy currents that are induced by flux changes.

Figure 4:
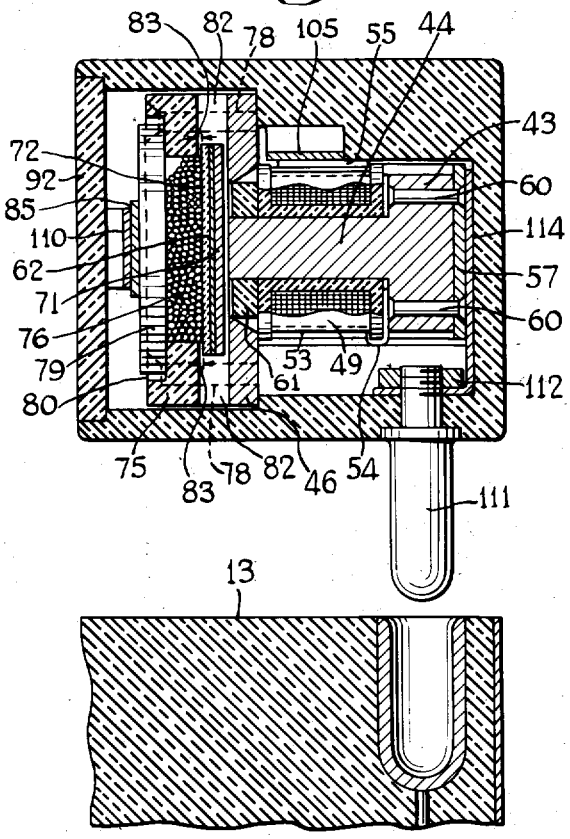
Fig. 4 is a vertical sectional view of the amplifier along line 4—4 of Fig. 3.
Figure 5:
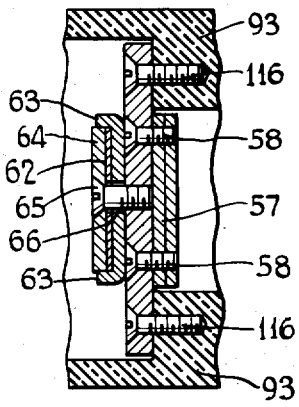
Fig. 5 is a vertical sectional view along line 5—5 of Fig. 2.

On the center core 44 is mounted the inducing coil 49 which is covered by a strip 53 of varnished cloth of similar insulating material wound around the coil turns and fastened in place by pasting. The strip has secured thereto, by riveting or otherwise, two resilient contact strips 54 and 55, of phosphor bronze, for instance. In winding the cloth strip 53 over the turns, the end portion of the strip is wound over the portions of the two contact strips underlying the cloth strip, attaching the contact strips 54 and 55 to the opposite sides of the coil. The two ends of the coil are then soldered to the projecting portions of the contact strips 54 and 55, which form terminal connections for the coil 49. As shown in Fig. 4, the contact strip 54 is bent under the spool end, establishing an electrical connection with the underlying portion of core 44; and the other contact strip 55 is insulated and bent upwardly over the coil, its spring action pressing it away from the coil.

The magnet members 41, core 44, coil 49 and pole plate 46 are held together as a unit by a clamping strap 57 of brass, or like material, which is bent to conform to the outer contour of the assembled core members. The end portions of the strap are doubled over, to form flanges underlying the ends of the pole plate 46 and are clamped thereto by flat-head screws 58 so that all the elements are held firmly in place. To prevent the loosening of any of the elements, spring members 59, formed of doubled-over resilient metal strips, may be inserted between the outer magnet surfaces and the strap 57 to hold all the elements under pressure. To facilitate the assembly, the center core 44 has its two rectangular bottom projections 43 secured, as by rivets 60, to the bottom portion of the clamping strap 57. Insulator ring 61 holds the end of core 44 spaced from the pole plate.

A thin resilient diaphragm 62 of hardened steel, or similar resilient material, in the form of a rectangular strip, is disposed in front of the pole plate 26 and has its ends clamped between adjusting blocks 63 and clamping blocks 64 to the ends of the pole plate 46, spaced therefrom, screws 65 threaded into holes in the pole plate ends serving to hold the blocks 63 and 64 in place. This permits free vibration of the main portion of the diaphragm 62 between the inner edges of the adjusting blocks 63, the length of the vibrating diaphragm being adjustable by shifting the adjusting blocks 63 along their slots 66 toward, or away from, the center of the pole plate.

The center portion 70 of the diaphragm 62 is made somewhat wider on the sides to form a square-like member, and has secured to its rear side, as by soldering, a flat, similarly-shaped armature 71 of soft magnetic iron, the armature lying with its center over the upper pole surface of the central core 44 and with its peripheral portion over the edge portion of the surrounding pole plate 46. The height of adjusting blocks 63 and the thickness of the armature are proportioned to provide a small armature gap between the armature 71 and the underlying pole surfaces of the center core 44 and the pole plate 46. The armature and the underlying pole surfaces of the center core 44 and pole plate 46 form thus two small gaps in series through which the permanent flux of the magnets 41 and the flux induced by the coil 49 passes.

To the front side of the center portion 70 of diaphragm 62, in alignment with the underlying armature 71, is secured a flat contact plate 72 of carbon by plating, spraying, painting, or otherwise covering with a metal coating the rear side of the plate and soldering, or otherwise attaching, it to the underlying portion of diaphragm 62 so that the armature, the carbon plate, and the intermediate diaphragm portion 70 constitute a substantially flat rigid member, having extending from the opposite sides thereof two resilient diaphragm strip extensions which are clamped at the ends to hold the armature spaced by a small gap from the rearwardly lying magnet pole faces. The central rigid member with the two resilient strip extensions constitute thus a diaphragm unit to which the magnet core body with its inducing coil imparts a vibratory movement in the direction away and toward the pole faces of the core.

Supported on the pole-face plate 46, and mounted directly in front of the carbon plate 72, is a microphone casing 75 made of a flat rectangular block of insulating material, such as phenolic condensation product, forming a border wall surrounding an inner, preferably circular, flat microphone cell 76 extending in vertical direction. At the rear side, the cell has a circular opening 77 bounded by a flat rim lying adjacent the front surface of the carbon plate 72, and at the front side, the cell has a circular opening closed by a circular contact plate or member 79, of carbon, fitting into a depression 80 formed around the cell opening on the front side of the block 75. At its four rear corners the microphone casing block 75 has rectangular spacing projections 82 extending towards the face of the pole plate 46 to hold the rear wall of the cell 76 at a distance from the pole face and the rear edges of the cell 76 directly in front of the carbon plate 72 of the diaphragm unit, spaced therefrom by a small gap 83. The casing block 75 is secured to the plate by four flat-head screws 78. The contact member 79 is held clamped in the front depression 80 of the microphone block 75 by a metal strip 85 having one bent-over end 86 slipped under the rear side of one edge of block 75, while the other end is fastened by a screw 87 to the opposite edge of block 75.

The interior of the cell 76 is filled with carbon grains so that, in the normal position, with the cell in vertical direction, the grains rest against the carbon plate 72 and contact member 79 under the pressure of their own weight only, as shown in Fig. 4. The gap 83 between the diaphragm carbon plate 72 and the rear edge of cell 76 is of a size at which falling out of grains from the cell during the reciprocating vibration movement of the plate is prevented, the plate decreasing the resistance of the carbon paths in the cell when moving toward it and increasing the resistance when moving away from the cell.

With the magnet cores assembled and supported on one side of the pole plate and the diaphragm unit and the microphone cell on the opposite side of the pole plate, the several elements may be readily assembled as a unit and tested in final condition.

The combined electromagnetic-microphone unit is housed in a low, narrow rectangular casing 90 of insulating material, such as a phenolic condensation product, which has an interior rectangular chamber 91 that is arranged to be closed at the front side opening by a flat cover 92 fitting between two ledges projecting from the bottom wall 93 and top wall 94. The rear portions of the bottom and top walls are of extra thickness to fit the bottom and top surfaces of the magnet assembly, the front portions of the walls being thinner to accommodate the somewhat wider pole plate 46 and microphone casing 75 mounted thereon. The right end wall 96 of the casing is also of increased thickness and has horizontally imbedded therein, as by molding, three socket sleeves 97, 98, 99 arranged to be engaged by three plug pins 101 to 103 of a plug 104 at the end of cord 14 from the receiver 11 and transmitter 12. The rear ends of the socket sleeves 97 to 99 end flush at the interior side of end wall 96.

The inner end of sleeve 97 has riveted thereto a connector strip 105 going upwardly along the end wall 96, then (as shown in dotted lines) running inwardly on the under side of the top wall 94, and terminating in a spring above the contact strip 55 of the inducing coil, making contact therewith.

The inner end of sleeve 98 has riveted thereto a connector strip 106 going downwardly along the end wall, and then rearwardly along the bottom wall to make contact with an anchor block 107 to which one battery plug 108 mounted on the bottom wall 93 of the casing is secured, making thus a direct bypass connection between socket sleeve 102 and battery plug 108.

The inner end of sleeve 99 has riveted thereto a connector strip 109 going first forwardly along the end wall 96, then bending and running underneath the front cover 92, and terminating in a spring unit 110 which is held by the cover 92 pressed against the metal strip 85 holding contact member 79 and making thus connection with one terminal of the microphone cell 76. The connector strip 109 may be readily bent, away in front, or back in place, to permit inserting or removal of the electromagnetic microphone unit.

There is an additional battery plug pin 111 mounted on the under side will 92 of the casing, the inner pin end having secured thereto by a block 112 a contact strip 114 going to the rear wall and terminating in a spring contact member making contact with the rear of the holder strap 57 and therethrough with the diaphragm carbon plate 72 of the microphone cell, and with the grounding contact 54 of the actuating coil 49.

Upon insertion of the assembled electromagnetic-microphone unit in the casing and closing the cover, contacts are automatically established between contact sleeve 97 and coil contact 55; between contact sleeve 99 and microphone cell plate 79; between battery plug 111 and the common contact of the carbon plate 72 of the cell and the grounded end of coil 55; there being also provided the bypass connection between the second battery plug 108 and contact sleeve 98. In order to firmly hold the electromagnetic-microphone unit in place, the four corners of the pole plate are fastened to the underlying wall projections by screws 116. The cover is fastened in place with screws 117 at its four corners.

To operate the hearing-aid device with the microphone amplifier, the cord plugs 17, 37, 104 are plugged in to the receiver 11, transmitter 12 and amplifier 15, and the amplifier is plugged in into the battery 13, establishing the circuits as shown in Fig. 1. To set the device in operation, the sliding contact member is moved into energizing position and the amounts of resistance 27 adjusted to fit the requirements.

In order to enable ready practice of the invention, but without limiting it thereto, there are given below the actual construction data of the microphone amplifier described above:

The permanent magnets 41 are of 17% cobalt steel, and have an area of about .288 square centimeters and a length of 1.4 centimeters. The center core 42 is of an iron-nickel alloy of high permeability, is 1.15 centimeters long and has a diameter of .32 centimeters. The diaphragm 62 is of hardened steel .010'' thick, and the active part between the inner edges of the adjusting blocks 53 is 2.25 centimeters long and .7 centimeters wide; its center portion 70 is 1.05 centimeters long and 1.05 centimeters wide; and its central equivalent mass in vibration is about .14 grams. The armature 71 is of cold rolled steel, .015'' thick, 1.0 centimeters long, .9 centimeters wide, and its mass is .32 grams. The carbon plate 72 is of highly compressed carbon, .020'' thick, 1.05 centimeters long, 1.05 centimeters wide, and its mass is .085 grams. The total effective vibratory mass of the diaphragm unit including the diaphragm 62, the armature 71, balls, and the carbon plate 72 is .67 grams; and the stiffness S of the diaphragm unit against lateral displacement is about $85.510^6$ dynes per centimeter. The natural frequency of the diaphragm unit is about 1800 cycles per second. The actuating coil has 800 turns of No. 39 copper wire and its impedance is 50 ohms at about 200 cycles alternating current of 2 milliamperes. The armature covers an effective area of .073 square centimeters on the core pole and .45 square centimeters on the pole plate. The two gaps have a length of about 3 to 4 mils when the armature is under the action of the permanent magnetic field. The microphone cell has a diameter of $\frac{11}{32}''$ and a thickness of $\frac{1}{16}''$, which together with the gap to the carbon plate gives a thickness of 78 mils. The cell is filled with carbon balls 0.5 millimeters in diameter. The maximum gap between the carbon plate and the rear edge of the cell is .25 millimeters. The total number of carbon balls in a filling is about 900. The assembled mechanism, without the casing, is 3 centimeters long, 1.6 centimeters high, and 1.6 centimeters deep. The mechanism with the casing is 4.5 centimeters long, 1.9 centimeters high, 2.2 centimeters deep, and its total weight is 38 grams. The microphone cord plug 104 is 1.4 centimeters long, .8 centimeters high, and 2.1 centimeters deep.

When the microphone transmitter 12 is not actuated, and no oscillatory currents flow through the actuating coil 49, only a permanent flux is induced in the armature gaps of the amplifier 15, the flux passing from the inner poles 42 of magnets 41, through center core 42 to its upper pole face, then through the short inner gap into the armature 71, then through the armature and short outer gap into the pole face of pole plate 46, and therethrough to the outer poles 45 of the magnets 41 of opposite polarity. Under the action of this permanent flux, the diaphragm 62 with the armature 71 will be held deflected toward the pole plate reducing the gap thereto.

If sound waves impinge upon the microphone transmitter 12, making it produce oscillatory sound currents, corresponding oscillatory fluxes are induced in the magnet core system, these oscillatory fluxes being superposed on the permanent flux and causing it to increase and decrease in accordance with the current oscillations. The resulting flux fluctuations vary the attraction exercised on the armature 71 and cause the diaphragm 62 to vibrate in accordance with the flux oscillations. The vibratory action of the diaphragm 62 imparts a corresponding reciprocating motion to the carbon plate 72 causing it to increase and decrease the pressure on the carbon balls in the cell and correspondingly vary the resistance of the carbon ball paths in accordance with the sound oscillations. The resistance variations set up amplified current variation in the receiver circuit connected in series with the microphone carbon balls and the battery, producing amplified sound impulses in the receiver.

The microphone amplified hearing-aid described above, and its special microphone amplifier embody features of construction and relationship which make the amplifying action stable and free from deterioration in use; assure uniformity of response and a high degree of intensity as well as quality of reproduction over the entire range of sound frequency important for hard-of-hearing persons; and enable reduction of the size and shaping of the structure of the hearing-aids in a way to render them convenient and inconspicuous.

The microphone chamber and the vibrating diaphragm unit cooperating therewith are of special construction. In the past, either relatively large carbon balls or very fine formless grains were preferably used as microphone chamber fillings. In accordance with the present invention, the chamber or cell filling is preferably made of very small carbon balls, for instance, of 0.5 millimeter diameter, generally available in the trade, although satisfactory results are also obtained with balls of other sizes not larger than about 0.7 millimeter.

The cell for holding the carbon balls is of generally symmetrical, flat shape, and dimensioned to hold about 3 to 5 balls in series between the rear and front contact walls. The ratio of the thickness of the cell to the area thereof should be between about 1:25 and 1:50. Thus, with a chamber having a thickness of about 75 mils, a diameter of $\frac{11}{32}''$, and a filling of carbon balls of 0.5 millimeter, very good results are obtained.

At the front side of the chamber the carbon balls rest against, and make contact with, a terminal plate of carbon secured over the front opening of the chamber. At the opposite side of the chamber, in front of the magnet, the carbon balls rest against, and make contact with, a carbon plate somewhat larger than the rear opening and held spaced by a small gap therefrom to prevent falling out of the balls, but yet permit to push the balls slightly into the interior of the chamber or release them therefrom in accordance with the oscillatory reciprocating movement imparted to the plate by the diaphragm of which it is a part.

An essential condition for good amplifier-microphone action is the use of a carbon body as a contact material for vibratorily moving the carbon particles in the cell. Vibrating carbon plates for actuation of microphone carbon contacts have been long known, and are widely employed in ordinary microphone transmitters. As used till now the carbon plate portion acting on the carbon contacts was only a part of a larger carbon plate, clamped at the edges, and serving as the vibratory diaphragm and imparting the sound vibrations to the portion acting on the carbon granules. In ordinary microphones there was no difficulty in using the carbon plates for this dual function because there the diaphragm is normally not under pull, and the only tension to which it is subjected is that due to the small force of the air vibration transmitted to the diaphragm by the sound.

In an amplifier microphone, the vibratory diaphragm is under a continuous pull of the strong magnetic field which is required to generate vibrations of sufficient power for actuations of the carbon particles and giving high intensity sound reproduction. When such carbon plate diaphragms are applied to microphone amplifiers, they either crack soon because of the excessive magnetic pull, or they must be left under such light pull that they are not able to transmit enough power to the cell filling.

Microphone amplifiers also came into use in which a round diaphragm of thin stretched metal foil, only a few mils thick, coated with gold, was used to hold and impart movements to the carbon grains in the microphone chamber. It was found, however, that the carbon grains in the cell deposited a smudgy mass on the contacting metal surface, forming thereon resistance compositions notwithstanding the precious metal coating, and that the amplifier would as a result deteriorate after a short time, making it useless.

The microphone amplifier of the invention overcomes the difficulties encountered with all-carbon diaphragms as well as those encountered with all-metal diaphragms. In the improved amplifier the contact plate acting on the carbon particles in the cell is only large enough to extend beyond the edges of the cell and vibrate the carbon balls thereon without permitting their falling out. This carbon plate, with the portion of the diaphragm strip to which it is attached, and the small armature underlying the latter, constitute a rigid, flat unit which performs a substantially purely translational piston-like movement when impelled toward, and pulled from, the chamber opening. As a result, substantially the entire ball body receives a uniform impact, and accordingly undergoes a relatively uniform resistance variation in the circuit which conveys through it the current to the receiver. This uniform resistance variation, distributed over almost the entire depth of the carbon body having uniform contact surfaces, secures a high intensity of sound reproduction, and thus supplies the chief requirement of the amplifier.

Because of the ability to produce this uniform resistance variation, while using a great quantity of small contact surfaces, there is also obtained a very high quality of sound production, thus combining intensity and quality of reproduction to a very high degree, which heretofore seemed difficult to reach.

The combined use of a carbon plate contact member with a resilient metal diaphragm secures all the benefits of metallic material for taking care of the stresses impressed upon the diaphragm by the magnetic system in imparting it the vibrations. This diaphragm may be made from a thin resilient supporting sheet, of metal or other material of high tensile strength, such as mica, having attached to one side of its center a carbon plate of a size sufficient to cover the chamber opening and vibrate the carbon grains, and to the opposite side of its center an armature disk, the three elements forming a flat, rigid center unit with a resilient sheet extending around it. This resilient sheet may be of circular form and either of sufficient thickness and held clamped at the edges; or of thin foil and held stretched at the edges, for vibrating the center unit.

A simple and very desirable diaphragm unit, and one easiest to adjust, is obtained by following the construction shown in Figs. 2 to 6, and using for the diaphragm an elongated, relatively narrow, flat strip of resilient metal, or other sheet material of high tensile strength, such as mica. At the center, the strip is provided with a suitably shaped supporting portion holding attached to it on one side the microphone carbon plate and on the other side the armature. From both sides of this rigid center portion extend the resilient, relatively narrow, strip portions which are clamped at their ends to maintain the carbon plate in the proper position before the microphone chamber opening and the armature before the magnet pole faces, to permit vibration within the narrow space therebetween.

The strip shape of the diaphragm unit permits very easy adjustment of resonant frequency of the diaphragm and of the width of the gaps by merely slightly loosening the screws holding the clamping blocks 64. Then the adjusting blocks 63 supporting and pivoting the strip at their inner edges are slightly pushed inwardly or outwardly until the desired adjustment is obtained and the screws then tightened. By such movement of the adjustment blocks 63, the gaps may be adjusted with an accuracy of less than 25/10,000". Instead of clamping the diaphragm-strip ends, they may be held stretched in suitable stretchers mounted on the magnet structure, and the tension of the diaphragm adjusted by controlling the stretching.

High and substantially uniform response over the sound frequency range is obtained by making the diaphragm resonant between 1,500 and 2,500 cycles per second, a frequency from the range between 1,800 and 2,200 cycles being preferred; and at the same time making the impedance of the actuating coil equal to the impedance of its input circuit at a frequency between 100 and 400 cycles, and preferably near 200 cycles.

Another feature of the invention resides in the special coordination of the elements of the electromagnet and the microphone to secure an efficient, high quality power transformation in the amplifier unit, and yet make its mounting and wear, firm, comfortable and inconspicuous. By the powerful magnetic action and symmetrical excitation of the armature gap is obtained a symmetrical low magnet core arrangement that forms an elongated structure extending lengthwise the elongated strip diaphragm.

Figure 7:
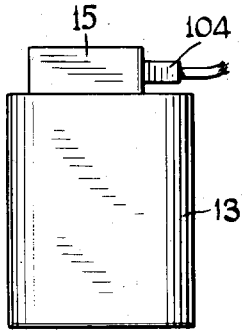
Fig. 7 is a side elevational view of the amplifier mounted on the battery.
Figure 6:
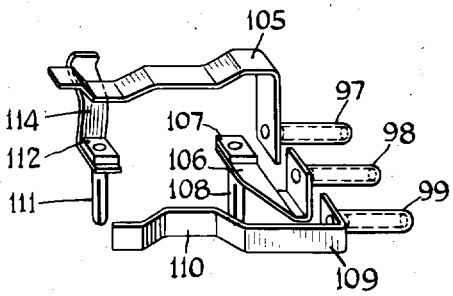
Fig. 6 is a partially phantom view of the arrangement of the contact plugs and sockets of the amplifier with their interior contact members.
Figure 8:
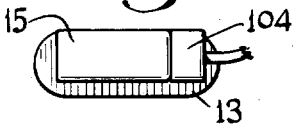
Fig. 8 is a top horizontal view of the amplifier mounted on the battery.

The complete microphone amplifier is constructed as a low and narrow unit fitting over the top of the dry cell battery with which the device is used, as shown in Figs. 7 and 8, the bottom having battery plug pins fitting into the conventional battery socket sleeve terminals provided on the top surface of the battery. The lower the amplifier unit is, the less it is likely to be tipped over, or pulled out of its place, or have its plugs broken and thus damaged, and its functioning interfered with. The design of the mechanical elements of the amplifier as a unit formed around a narrow diaphragm strip, makes it possible to cut down the total height of the unit practically to the width of the pole plate. The microphone chamber lies in vertical direction, giving the proper distribution of the carbon ball pressure on the contact walls of the chamber and the instrument is automatically maintained in the most favorable operating position. The several elements of the magnetic system are mounted on one side of the pole plate with a minimum of manipulations, and on assembly constitute a unit complete by itself. The diaphragm and the microphone chamber are assembled as a separate unit on the other side of the pole plate, and the electrical and mechanical structure of the amplifier are completed and adjusted before insertion into the casing. The mounting of the assembled structure within the casing requires merely its insertion within the opening of the casing. The spring contacts from the plugs and sockets on the walls of the casing automatically establish the conducting connections with the contact terminals on the structure, and no soldering of connections or involved manipulations are necessary after insertion.

To connect the transmitter and receiver with the amplifier and the battery, a set of three contact sleeves is provided in one of the lateral end walls of the amplifier casing into which the three-pin plug of the cord is inserted. This plug forms a longitudinal extension of the amplifier casing and lies on the top of the battery. This mounting of the plug on the lateral end of the amplifier casing keeps the height of the elements projecting above the battery down. The tilting force of the plug does not act additively to the tilting force of the amplifier unit, but in a different direction where it is not cumulative.

The amplifier hearing-aid device as shown in the drawings may be readily turned into a non-amplifying single-circuit aid by simply pulling out the cord plug 104 from the amplifier, pulling out the amplifier 15 with its plugs 108, 111 from the battery, and plugging in the cord plug 104 directly into the battery, the plug pins being polarized so that pin 101 engages the battery sleeve terminal engaged by amplifier pin 108, and pin 103 engages the battery sleeve terminal engaged by amplifier pin 111. A single direct operating circuit is then obtained as follows: From the right hand battery socket through its engagement with plug pin 103 of the cord plug, its connecting strand in cord 14 to receiver coil 16, thence to pin of the transmitter plug 37, resistor 27, movable contact 30, contact 28, through the two microphones 21, 22, plug contact 31, plug pin 36, cord 14, cord plug pin 101 to the other battery pole.

Only a single cord is used both for single-circuit or cascade-amplifier operation, and the plug connections are simple and do not require particular care and attention in handling. In order to accommodate the central pin 102 of cord plug 104 when inserted directly into the battery, the battery may be provided with a third dead pin hole 118 between its two terminal sleeves; or an adaptor may be provided which has two pins fitting into the battery and three sockets, two external live ones connected to the two battery pins and one dead one for receiving the central dead pin of the plug; or the central pin 102 of the cord plug may be shorter or self-retracting so that the two end pins will engage the battery terminal sleeves without being interfered with by the central pin.

The control unit provided on the transmitter enables cutting out of the battery and control of the intensity, whether the hearing-aid device is used with the amplifier or without the amplifier, the circuit arrangement being such that when used with an amplifier, the resistor lies in the receiver circuit and the stationary contact member of the control unit lies in the circuit of the primary microphone, and that when used without the amplifier, the resistor and the stationary contact member are connected in series between the receiver and the primary microphone.

The amplifying hearing-aid of the present invention embodies thus a number of important features which add greatly to its efficiency and utility as a hearing-aid. The use of a carbon plate covering only the opening of the carbon holding chamber and rigidly supported on one side of a high-tensile-strength vibratory sheet diaphragm, carrying on the opposite side a magnetically, vibrated armature, enables the combination of the benefits of the use of carbon as the oscillation imparting contact wall with the benefits of the stiff metal sheet for the vibrator action. The use of very small carbon balls as chamber filling, gives high intensity as well as high quality of sound reproduction. Formation of the sheet diaphragm as a strip and longitudinally adjustable clamping of its ends, enables easy and accurate adjustment of the gaps, and the resonant frequency of the diaphragm. The diaphragm with a high resonance frequency around 1800 to 2200 cycles per second and the actuating coil with an impedance equal the impedance of its input circuit at around 200 cycles per second, secures a high and substantially uniform response over the entire frequency range, important for microphone amplifier aids. Forming a symmetrical and powerful electromagnetic system and microphone chamber into a low, elongated structure along the narrow long diaphragm strip, gives a low, but powerful, amplifier unit, nesting on the top of the battery, with small leverage acting on the plug pins inserted in the battery. Mounting of the amplifier plug for insertion from small end of the amplifier unit within boundary of battery top, brings amplifier plug pins into a different direction than the battery plug pins, reducing the tilting and wrenching forces.

The invention is not limited to any particular details and materials of construction or operation described above, as many modifications and equivalents thereof will suggest themselves to those skilled in the art. It is, accordingly, desired that the appended claims be given a broad construction commensurate with the scope of the invention.

We claim as our invention:

1. A portable microphone amplifier for amplifying electrical sound-frequency current oscillations in a portable hearing-aid device, comprising a microphone chamber having an insulating surrounding wall with an exposed opening on one side thereof, a terminal contact member bounding the surface of said chamber on the side opposite said opening, a relatively rigid carbon block having a surface covering said opening, a filling of carbon grains in said chamber extending between said contact member and said carbon block and constituting a variable resistor therebetween, a resilient thin sheet of material having substantially higher tensile strength than said carbon block underlying said block and having free flexible portions extending beyond the opposite edges of said block to constitute a vibratory diaphragm unit for imparting to said block a vibratory movement toward and away from said contact member and vary the pressure exerted on said filling substantially uniformly over the major portion of the cross sectional area of said chamber, said block having an edge portion sealing said opening and retaining said filling within said chamber during said movement, a magnetic armature secured to said sheet opposite said block, and electromagnetic means on the side of said armature opposite said sheet actuated by supplied current oscillations to impart said vibratory movement to said diaphragm unit.

2. A portable microphone emplifier for amplifying electrical sound-frequency current oscillations received from a microphone and supplying the amplified oscillations to a receiver in a portable hearing-aid device, comprising a substantially flat microphone chamber having an insulating surrounding wall with an exposed opening on one flat side thereof, a terminal contact member bounding the surface of said chamber on the side opposite said opening, a relatively rigid carbon plate covering said opening, a filling of carbon balls in said chamber extending between said contact member and said carbon plate and constituting a variable resistor therebetween, a resilient thin sheet of material having substantially higher tensile strength than said carbon plate underlying said plate and having free flexible portions extending beyond the opposite edges of said plate to constitute a vibratory diaphragm unit for imparting to said plate a vibratory movement toward and away from said contact member and vary the pressure exerted on said filling substantially uniformly over the major portion of the cross sectional area of said chamber, said plate having an edge portion sealing said opening and retaining said filling within said chamber during said movement, a magnetic armature secured to said sheet opposite said plate and constituting with said plate and the intermediate sheet portion a rigid flat member, and electromagnetic means on the side of said armature opposite said sheet actuated by supplied current oscillations to impart said vibratory movement to said diaphragm unit.

3. A portable microphone amplifier for amplifying electrical sound-frequency current oscillations received from a microphone and supplying the amplified oscillations to a receiver in a portable hearing-aid device, comprising a substantially flat microphone chamber having an insulating surrounding wall with an exposed opening on one flat side thereof, a terminal contact member bounding the surface of said chamber on the side opposite said opening, a relatively rigid carbon plate covering said opening, a filling of carbon balls in said chamber extending between said contact member and said carbon plate and constituting a variable resistor therebetween, a resilient thin metallic strip underlying said plate and having free flexible portions extending beyond the opposite edges of said plate and clamped at the ends to constitute a vibratory diaphragm unit for imparting to said plate a vibratory movement toward and away from said contact member and vary the pressure exerted on said filling substantially uniformly over the major portion of the cross sectional area of said chamber, said plate having an edge portion sealing said opening and retaining said filling within said chamber during said movement, a magnetic armature secured to said sheet opposite said plate and constituting with said plate and the intermediate sheet portion a rigid flat member, and electromagnetic means on the side of said armature opposite said sheet actuated by supplied current oscillations to impart said vibratory movement to said diaphragm unit.

4. A portable microphone amplifier for amplifying electrical sound-frequency current oscillations received from a microphone and supplying the amplified oscillations to a receiver in a portable hearing-aid device, comprising a substantially flat microphone casing having a closed insulating border wall confining a flat cell having an opening of the width of said cell on one flat side thereof, a terminal contact member bounding the surface of said cell on the side opposite said opening, a relatively rigid carbon plate covering said opening, a filling of carbon balls in said chamber extending between said contact member and said carbon plate and constituting a variable resistor therebetween, and a resilient thin narrow metallic strip underlying said plate and having free flexible portions extending beyond the opposite edges of said plate and clamped at the ends to constitute a vibratory diaphragm unit for imparting to said plate a vibratory movement toward and away from said contact member and vary the pressure exerted on said filling substantially uniformly over the major portion of the cross sectional area of said cell, said plate having an edge portion sealing said opening and retaining said filling within said cell during said movement, a magnetic armature secured to said strip opposite said plate and constituting therewith a rigid flat member, and electromagnetic means on the side of said armature opposite said strip actuated by supplied current oscillations to impart said vibratory movement to said diaphragm unit.

5. A portable microphone amplifier for amplifying electrical sound-frequency current oscillations received from a microphone and supplying the amplified oscillations to a receiver in a portable hearing-aid device, comprising a microphone casing having a closed insulating border wall confining a flat cell having an opening on one side thereof, a terminal contact member bounding the surface of said cell on the side opposite said opening, a relatively rigid carbon plate covering said opening, a filling of carbon balls of a diameter not greater than 0.7 millimeters in said cell extending between said contact member and said carbon plate and constituting a variable resistor therebetween, a resilient thin sheet of material having substantially higher tensile strength than said carbon plate underlying said plate and having free flexible portions extending beyond the opposite edges of said plate and clamped at the ends to constitute a vibratory diaphragm unit for imparting to said plate a vibratory movement toward and away from said contact member and vary the pressure exerted on said filling substantially uniformly over the major portion of the cross sectional area of said cell, said plate having an edge portion sealing said opening and retaining said filling within said cell during said movement, a magnetic armature secured to said sheet opposite said plate and constituting with said plate and the intermediate sheet portion a rigid flat member, and electro-magnetic means on the side of said armature opposite said sheet actuated by supplied current oscillations to impart said vibratory movement to said diaphragm unit.

6. A portable microphone amplifier for amplifying electrical sound-frequency current oscillations received from a microphone and supplying the amplified oscillations to a receiver in a portable hearing-aid device, comprising a microphone casing having a closed insulating border wall confining a flat cell having an opening on one side thereof, a terminal contact member bounding the surface of said cell on the side opposite said opening, a relatively rigid carbon plate covering said opening, a filling of carbon balls in said cell extending between said contact member and said carbon block and constituting a variable resistor therebetween, a resilient thin narrow metallic strip supporting said plate at said cell opening to hold said balls in said cell and vary the resistance of said balls upon being vibratorily moved toward and away from said contact member, said plate having an edge portion sealing said opening and retaining said filling within said cell during said movement, a magnetic armature secured to said strip on the side opposite to said plate and constituting with said plate and intermediate strip portions a rigid flat central member, said strip extending beyond the edges of said plate and armature to constitute therewith a vibratory diaphragm unit having its effective resilience in the portions outside of said plate, means for clamping opposite ends of said diaphragm strip at adjustably variable distances from said central member, and electromagnetic means on the side of said armature opposite said sheet actuated by supplied current oscillations to impart said vibratory movement to said diaphragm unit.

7. A portable microphone amplifier for use in conjunction with a portable hearing-aid device having an input circuit impressing weak electrical sound-frequency oscillations on said amplifier and an output circuit supplied with amplified oscillations by said amplifier, comprising a microphone casing having a closed insulating border wall confining a flat cell having an opening on one side thereof, a terminal contact member bounding the surface of said cell on the side opposite said opening, a relatively rigid carbon plate covering said opening, a filling of carbon balls in said cell extending between said contact member and said carbon block and constituting a variable resistor therebetween, a resilient thin sheet of material having substantially higher tensile strength than said carbon plate underlying said plate and having free flexible portions extending beyond the opposite edges of said plate to constitute a vibratory diaphragm for imparting to said plate a vibratory movement toward and away from said contact member and vary the pressure exerted on said filling substantially uniformly over the major portion of the cross sectional area of said cell, said plate having an edge portion sealing said opening and retaining said filling within said cell during said movement, a magnetic armature secured to said sheet opposite said plate and constituting with said plate and the intermediate sheet portion a vibratory diaphragm unit having a rigid center member and effective resilience in the border portions outside said rigid member, a magnetic core body having pole surfaces spaced by a small gap from said armature and constituting a low reluctance induced flux path forcing a permanent flux through said gap, and an actuating coil interlinked with said core body and connected to said input circuit to induce flux fluctuations in said gap imparting vibrations to said diaphragm and varying accordingly the resistance of the filling in said cell, said diaphragm unit having a resonance frequency lying within the range between 1500 and 2500 cycles per second and said actuating coil having an impedance of the order of the impedance of the input circuit at a current frequency within the range between 100 and 400 cycles per second.

8. An inconspicuous portable microphone amplifier for detachable mounting on the top of an inconspicuous portable flat dry battery casing of a portable hearing-aid device including a transmitter energized by said battery, comprising a microphone casing having a closed insulating border wall confining a flat cell having an opening on one side thereof, a terminal contact member bounding the surface of said cell on the side opposite said opening, a relatively rigid carbon plate covering said opening, a resilient thin narrow metallic strip underlying said plate and having free flexible portions extending beyond the opposite edges of said plate and clamped at the ends to constitute a vibratory diaphragm unit for imparting to said plate a vibratory movement toward and away from said contact member and vary the pressure exerted on said filling substantially uniformly over the major portion of the cross sectional area of said cell, said plate having an edge portion sealing said opening and retaining said filling within said cell during said movement, a magnetic armature secured to said strip opposite said plate and constituting with said plate and the intermediate strip portion a substantially rigid flat member, an elongated magnetic core having core elements extending along said diaphragm strip on the side opposite said casing and constituting a low reluctance induced flux path having concentric pole faces of opposite polarity symmetrically positioned against and spaced by a short gap from said armature, and actuating coil receiving current oscillations from said transmitter interlinked with said core element to produce flux fluctuations in said gap imparting vibrations to said diaphragm unit and therethrough to said carbon balls, and an elongated casing enclosing said amplifier elements having a relatively low height and a length equal to about twice the height and holding said flat cell in upright position, the bottom side of said amplifier casing fitting within the area of said battery casing top and having downwardly extending plug pins engaging the battery terminal sleeves to establish the circuit connections from the battery to the elements in the interior of said casing, one of the end surfaces of the elongated casing carrying contact sleeves extending in the direction of the length of said casing for engaging plug pins leading to the external circuits of said hearing-aid.

9. A portable microphone amplifier for amplifying electrical sound-frequency current oscillations in a portable hearing-aid device, comprising a microphone chamber having an insulating surrounding wall with an exposed opening on one side thereof, a terminal contact member bounding the surface of said chamber on the side opposite said opening, a carbon block having a surface covering said opening, a filling of carbon grains in said chamber extending between said contact member and said carbon block and constituting a variable resistor therebetween, a resilient thin sheet of material having substantially higher tensile strength than said carbon block supporting said block at said opening to hold said grains in said chamber, means constituting a magnetic armature on the side of said sheet opposite said block, said sheet extending beyond the edges of said block and constituting therewith a vibratory diaphragm unit having its effective resilience in the portions of said sheet outside said block for imparting to said block a vibratory movement toward and away from said contact member uniform over the major portion of the cross-sectional area of said chamber, said block having an edge portion sealing said opening and retaining said filling within said chamber during said movement, and electromagnetic means on the side of said armature opposite said sheet actuated by supplied current oscillations to impart said vibratory movement to said diaphragm unit.

10. An inconspicuous portable microphone amplifier for detachable mounting on the top of an inconspicuous portable flat dry battery casing of a portable hearing-aid device including a transmitter energized by said battery, comprising a microphone casing having a closed insulating border wall confining a flat cell having an opening on one side thereof, a terminal contact member bounding the surface of said cell on the side opposite said opening, a carbon plate covering said opening, a filling of carbon grains in said cell extending between said contact member and said carbon plate, an electromagnetic mechanism for imparting a vibratory movement to said carbon plate toward and away from said contact member and vary the resistance of said granule filling, and an elongated casing enclosing said amplifier elements having a relatively low height and a length equal to about twice the height and holding said flat microphone cell in upright position, the bottom side of said amplifier casing fitting within the area of said battery casing top and having downwardly extending plug pins engaging the battery terminal sleeves to establish the circuit connections from the battery to the elements in the interior of said casing, one of the end surfaces of the elongated casing carrying contact means for establishing a plug pin engagement with the external circuits of said hearing-aid, the contact surfaces of said engagement extending in the direction of the length of said casing.

11. An inconspicuous portable microphone amplifier for detachable mounting on the top of an inconspicuous portable flat dry battery casing of a portable hearing-aid device including a transmitter and receiver energized by said battery to be worn on the body of the user, comprising a microphone casing having a closed insulating border wall confining a flat cell having an opening on one side thereof, a terminal contact member bounding the surface of said cell on the side opposite said opening, a vibrating member having a surface covering said opening, a filling of carbon grains in said cell extending between said contact member and said vibrating member, an electromagnetic mechanism for imparting a vibratory movement to said vibrating member toward and away from said contact member and varying the resistance of said grain filling, and an elongated casing enclosing said amplifier elements having a relatively low height and a length equal to about twice the height and holding said flat microphone cell in upright position, the bottom side of said amplifier casing fitting within the area of said battery casing top and having plug pins detachably engaging battery terminal sleeves in said battery top to establish circuit connections from the battery to elements in the interior of said casing, and additional contact means on one of the end surfaces of the elongated casing for establishing a detachable plug pin engagement with an external plug member holding terminal contacts of external circuit leads of said hearing-aid connected by said plug pin engagement to elements in the interior of said casing, the plug pins between said casing and said battery extending downwardly into the battery terminal sleeves and the plug pin engagement between the end surface of said casing and said external plug extending in the direction of the length of the casing holding the battery, the amplifier casing and external plug member joined into a stable self-supporting unit resistant to external forces tending to loosen the junctions therebetween.

12. An inconspicous portable microphone amplifier for detachable mounting on the top of an inconspicuous portable flat dry battery casing of a portable hearing-aid device including a transmitter and receiver energized by said battery to be worn on the body of the user, comprising a microphone casing having a closed insulating border wall confining a flat cell having an opening on one side thereof, a terminal contact member bounding the surface of said cell on the side opposite said opening, a movable contact member having a surface covering said opening, a filling of carbon grains in said cell extending between said terminal contact member and said movable contact member, an electromagnetic mechanism for imparting a vibratory movement to said movable contact member toward and away from said terminal contact member and varying the resistance of said grain filling, and an elongated casing enclosing said amplifier elements having a relatively low height and a length equal to about twice the height and holding said flat microphone cell in upright position, the bottom side of said amplifier casing fitting within the area of said battery casing top and having downwardly extending plug pins engaging the battery terminal sleeves to establish the circuit connections from the battery to the elements in the interior of said casing, one of the end surfaces of the elongated casing carrying contact means for establishing a plug pin engagement with the external circuits of said hearing-aid, the contact surfaces of said engagement extending in the direction of the length of said casing.

HUGO LIEBER.
EMMANUEL CHRIST NICHOLIDES.